United States Patent [19]
Fallon et al.

[11] 3,736,490
[45] May 29, 1973

[54] BATTERY CHARGER WITH VOLTAGE COMPARATOR CONTROL CIRCUIT WHICH IS INSENSITIVE TO LINE VOLTAGE VARIATIONS

[75] Inventors: William H. Fallon, Parma; Paul P. Rieger, North Olmsted; Donald K. Richards, Cleveland, all of Ohio

[73] Assignee: General Battery Corporation, Reading, Pa.

[22] Filed: Apr. 13, 1971

[21] Appl. No.: 133,695

Related U.S. Application Data

[63] Continuation of Ser. No. 863,919, Oct. 6, 1969, abandoned.

[52] U.S. Cl. ...................................... 320/39, 320/59
[51] Int. Cl. ................................................ H02j 7/02
[58] Field of Search ...................... 323/44, 45; 320/39, 320/40, 2, 58, 59, 60, 61; 322/28

[56] References Cited

UNITED STATES PATENTS

| | | | |
|---|---|---|---|
| 3,321,691 | 5/1967 | Walsh | 320/40 |
| 3,073,999 | 1/1963 | Petrigalla | 320/40 |
| 3,022,458 | 2/1962 | Sola | 323/45 |
| 3,341,763 | 9/1967 | Noddin | 320/71 X |
| 3,310,724 | 3/1967 | Grafham | 320/DIG. 2 |

*Primary Examiner*—J. D. Miller
*Assistant Examiner*—Robert J. Hickey
*Attorney*—Paul & Paul

[57] ABSTRACT

Control circuits are disclosed, capable for use for charging batteries, for providing a first continuous power output to a load and a second supplemental controlled output responsive to the voltage level of the load. Both single phase and three phase embodiments utilize a controlled rectifier having its gate signal controlled by a signal developed on the tap of a variable resistor connected to the load. The voltage on the load is compared to a reference voltage across a zener diode so that when the load voltage drops, the controlled rectifier conducts to provide supplemental direct current output to the load. A high leakage transformer is utilized in both the single phase and three phase embodiments, the high leakage transformer acting to maintain the reference voltage across the zener during variations of line voltage, so that the control circuit is continuously operative during such line variations.

3 Claims, 4 Drawing Figures

Patented May 29, 1973

INVENTORS
WILLIAM H. FALLON,
PAUL P. RIEGER &
BY DONALD K. RICHARDS

S. A. Giavratano
ATTORNEYS

Patented May 29, 1973 3,736,490

INVENTORS
WILLIAM H. FALLON,
PAUL P. RIEGER &
BY DONALD K. RICHARDS

S. A. Giavratana
ATTORNEYS 3,736,490

BATTERY CHARGER WITH VOLTAGE COMPARATOR CONTROL CIRCUIT WHICH IS INSENSITIVE TO LINE VOLTAGE VARIATIONS

CROSS-REFERENCES TO RELATED APPLICATIONS

This application is a Continuation of the co-pending application of the same inventors having Ser. No. 863,919, now abandoned filed Oct. 6, 1969, and assigned to the same assignee as the assignee of this application.

BACKGROUND OF THE INVENTION

This invention relates to an electronic circuit which is capable of providing a power output to a load, such as a battery, in which the charging current is independent of variations in the input voltage and in which the semiconductor elements are protected from line transients. More particularly, this invention relates to an electronic circuit which provides both a minimum power output to a load and a supplemental power output determined in accordance with the voltage level on the load.

Past efforts have produced a wide variety of circuits directed to a solution of the problem of providing a controlled charge to a load. In certain installations, a charging current responsive to the needs of the load is preferred while maintaining a minimum charge to the load regardless of its needs. When such circuits are used for charging batteries, it is desired to produce a relatively high charging current when the charge on the battery is low and automatically reduces the charging current to a minimum when the battery has come to full strength. However, it is also preferred in this art to maintain a minimum direct current charging level as long as the battery is connected to the charging circuit. Further, the operation of the battery charging circuit should be essentially independent of variations in the line voltage which is supplying the power.

It is known that a battery may be safely charged at a much higher rate during the first portion of its charging period than during the later stages. One known prior art arrangement uses hand control to achieve suitable resistance variations in the charging circuit. Another circuit achieves the same result by applying a constant potential to the battery to provide a low current charge wherein the difference between the applied voltage and the counter voltage of the battery becomes gradually less as the charging proceeds.

In addition, other prior art solutions to the above problems have included ferro-resonant transformer and rectifier circuits, magnetic amplifier circuits coupled to rectifier circuits, and transformers coupled to controlled rectifier circuits.

It is also desirable because of cost and size savings to use solid state components in charging circuits. When solid state components are used, special precautions must be taken to protect the components from line transients and from variations in the input voltage. Moreover, charging circuits according to the prior art have utilized a large number of components in rather complex circuits.

Thus, it has been an aim in the art to provide a charging circuit which is predominantly comprised of solid state components in a simple circuit relationship while yet overcoming the problems of the prior art. Still another aspect of the problem faced by the prior art in providing charging circuits is to produce a basic and simple circuit which may be effectively used for both single phase and three phase inputs by changing only a minimum number of components, such as input transformers, and which controls the charging rate of the battery as a function of the battery voltage, without significant impairment of operation at a reduced line voltage.

Thus, it is a primary object of this invention to provide a charging circuit which utilized a minimum number of components in a relatively simple circuit.

It is a further object of this invention to provide single phase and three phase circuits which produce a minimum direct current charging level to the load and a supplemental direct current charging level responsive to the charge on the load itself.

It is a further object of this invention to provide a charging circuit which utilizes a controlled rectifier and a simple and inexpensive control means responsive to the charge on the load for causing the conduction of the controlled rectifier.

It is a further object of this invention to provide a circuit which includes impedance isolation between the source of alternating current voltage and the control networks and the controlled rectifier circuit means.

It is a further object of this invention to provide a charging circuit which is independent of the variations in the alternating current voltage supply.

It is still a further object of this invention to provide a charging circuit which may be used in circuit with single or three phase inputs.

It is another object of this invention to achieve impedance isolation in a charging circuit by using high leakage transformers.

SUMMARY OF THE INVENTION

Directed to overcoming the shortcomings of the prior art, the circuit according to the invention comprises an alternating current signal source and input circuit means coupled to the source. In the single phase embodiment, the input circuit comprises a high leakage transformer while the three phase embodiment utilizes a high leakage three phase transformer having a six phase output Rectifying means are coupled to the input circuit to proide a source of direct current signals. The single phase embodiment uses a rectifying diode coupled to the secondary of the input transformer, while the three phase embodiment utilizes a rectifying diode in circuit with each of the phase windings of the secondary. Each of the embodiments includes circuit means coupled to the rectifying means and to the load for providing a continuous minimum direct current charging output to the load.

Circuit means, including a controlled rectifier in circuit with the rectifying means and the load, are provided which include circuit control means coupled to the gate terminal of the controlled rectifier to control its conduction. The control circuit includes a source of reference potential, such as a zener diode, in circuit through a potentiometer with the load. The variable tap on the potentiometer is connected to the gate element of the controlled rectifier so that as the voltage across the load drops below a predetermined level, the gate element of the controlled rectifier causes the controlled rectifier to conduct, thus supplying current to the load at a relatively high level. A blocking diode is also in circuit with the load and the source of reference potential to prevent reverse current flowing from the load when the volage across the load exceeds a predetermined level.

The high leakage transformer, in both the single phase and three phase cases, cooperates with the control circuit to ensure that the control circuit be operative at low line voltages. The voltage supplied by the transformer secondary must be sufficient to estabish the reference voltage across the zener diode. The regulating characteristic of the high leakage transformer acts to maintain a substantially constant voltage during drops in line voltage, thereby ensuring continuous operation of the control circuit.

Other features, objects and advantages of the invention will be apparent from the following description and a perusal of the circuit drawings.

DESCRIPTION OF THE DRAWINGS

Figure 1:
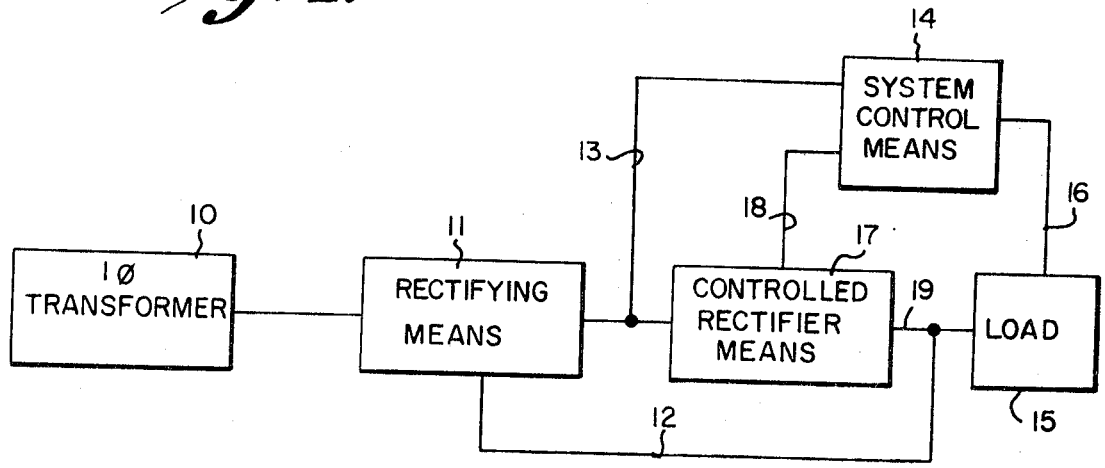
FIG. 1 is a block diagram of the single phase charging circuit according to the invention.

FIG. 1 discloses a block diagram showing the logic of the invention in which a single phase tranformer 10 is coupled to rectifying means 11 to provide a direct current signal at the output thereof. Means for providing a continuous minimum direct current level to the load is shown by circuit means 12 coupled to the load 15. The output of rectifying means 11 is connected by circuit means 13 to the system control means 14 which control the supplemental output tothe load 15, capable of receiving both the first regulated power output and a second controlled supplemental power output. System control means 14 also includes the means by which the charge on the load 15 is sensed by circuit means 16 to control the current conduction of the controlled rectifier means 17 through circuit means 18. When the controlled rectifier means 17 is activated, the supplemental direct current power level is provided to the load by way of circuit means 19 at a level determined by the charge on the load 15.

Figure 2:
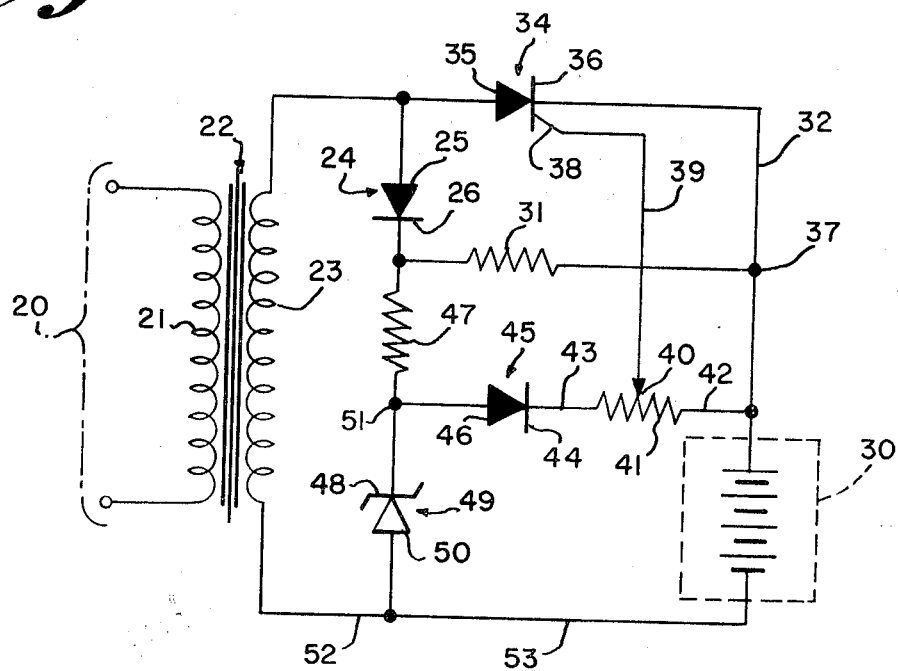
FIG. 2 is a detailed circuit diagram of the single phase charging circuit according to the invention.

In the detailed description of the single phase charging embodiment in FIG. 2, an alternating current signal source is representatively shown at 20 coupled to the primary 21 of high leakage transformer 22 which includes secondary 23. Transformer 22 comprises the input circuit means for the charging circuit.

The term "high leakage" transformer, as used in this specification, relates to transformers in which, due to their construction, a non-corresponding change in the secondary current occurs for a given change in the primary current. In a low leakage, or conventional transformer, the ratio of the primary voltage $V_p$ to the secondary voltage $V_s$ is nearly equal to the ratio of the turns of wire on the primary $N_p$ to the turns of wire on the secondary $N_s$, and the ratio of the primary current $I_p$ to the secondary current $I_s$ is the inverse of the turns ratio. Therefore, the product $V_pI_p$ is nearly equal to the product $V_sI_s$. Thus, in low leakage transformers, a change in the primary current tends to result in a nearly direct corresponding change in the secondary current since the major part of the flux links both the primary and secondary turns.

When, however, a significant portion of the flux is shunted or otherwise diverted from linking the turns of both the primary and secondary, the nearly direct correspondence between changes in the secondary current and voltage in relation to changes in the primary current and voltage is no longer true. This feature is used in this invention to provide impedance isolation between the input and output circuit of the transformer and thus to protect the semiconductor components from line transients, as well as maintain sufficient voltage so that the reference potential is continuously established during low voltage variations.

As an example of a flux shunting circuit used to divert the flux, a rectangular piece of steel located between the primary and secondary windings has been found to be satisfctory.

Diode 24 acts as a half-wave rectifier and has its anode 25 coupled to secondary 23 to provide a source of direct current for the charging circuit.

First circuit means are coupled to the cathode 26 of rectifying diode 24 to provide the first continuous power output to a load 30 such as a battery. The first circuit means include a resistor 31 which is connected to the cathode 26 of the diode 24 and to junction 37 which is in turn coupled to load 30.

Thus, the half-wave rectified signal which is appropriately reduced by the voltage drop across resistor 31 is continuously supplied to load 30 to provide a direct current power output to the load, regardless of the level of charge on the load. This direct current charging level is sometimes referred to in the art as the "trickle current."

Second circuit means are also coupled to the rectifying diode 26 for providing a second controlled regulated supplemental power output to load 30. The second circuit means include a controlled rectifier 34 having its anode 35 connected to the anode 25 of the diode 24 and to secondary 23 of the transformer 22. The cathode 36 of controlled rectifier 34 is connected to lead 32 so that a series circuit is provided by which the voltage from secondary 23, rectified by rectifier 34, is provided to load 30 when controlled rectifier 34 is conductive.

Circuit control means are provided for rendering the controlled rectifier 34 conductive in accordance with a predetermined voltage across the load 30. Thus, controlled rectifier 34 has its gate electrode 38 connected by way of lead 39 to the variable tap 40 of a variable resistor 41 which is in circuit with load 30 through lead 42. Lead 43 from the variable resistor is connected to the cathode 44 of a blocking diode 45 which has its anode 46 connected to the common point 51 between ballast resistor 47 and the cathode 48 of zener diode 49. The anode 50 of zener diode 49 is connected to the junction between secondary 23 of transformer 22 and one of the terminals of the load 30 by way of leads 52 and 53 respectively.

Variable resistor 41 permits the conductivity of the controlled rectifier to be adjustable and also provides a convenient adjustment for component tolerances within the circuit.

When diode 24 is conducting during the positive half wave on the secondary 23 of transformer 22, the zener diode 49 will break down and conduct and the voltage at point 51 is determined by the constant voltage drop across the zener diode 49 for the range of currents involved. Thus, the potential at point 51 is a regulated potential by virtue of the action of the zener diode.

It is understood that the zener diode 49 breaks down and conducts only when the peak voltage across secondary 23 is in excess of the zener breakdown voltage. For example, if the zener breakdown voltage is 31 volts, the peak value of the voltage across secondary 23 must exceed 31 volts before the zener is driven into its reference area of conduction. It is therefore obvious to one skilled in the art that high leakage transformer 22 must have a turns ratio providing a peak secondary voltage in excess of the zener breakdown voltage, for a nominal line voltage placed across primary 21. Further, the high leakage characteristic of transformer 22 provides that sufficient voltage is maintained across the secondary 23 when drops in the line voltage are encountered, so that the zener diode is turned on each half cycle, thereby establishing the reference potential. If, during periods of low line voltage, the peak voltage across secondary 23 is permitted to drop below the zener reference voltage, the zener is not fully driven into its conductive region, and does not act as a reference source. Accordingly, under such circumstances, the control circuit as such would be inoperative.

The use of the high leakage transformer enables the secondary voltage to be set for the desired trickle current after turn-off of the SCR, while providing that the control circuit operation is relativly invulnerable to the drops in line voltage. The peak secondary voltage is maintained by the high leakage transformer at a value above the zener reference voltage, but at or just nominally above the voltage to which the battery is to be charged. In this manner, trickle current after cut-off of the controlled current is properly limited, preferably to milliamps. By contrast, if a low leakage transformer were used, the turns ratio of the transformer would have to be such as to provide a secondary voltage always much greater than the zener breakdown voltage, and also much greater than the rated battery voltage, so that a drop in line voltage would not render the control circuit inoperative. However, if this were done, the battery would continue to be charged through the trickle circuit far above the SCR cut-off voltage, causing excessive charging of the battery and likely burnout. In short, the tapering-off characteristic would not be properly matched to the battery. Thus, the use of the high leakage transformer in cooperation with the control circuit is necessary in order to both provide the desired tapering off charging characteristic and to ensure continuous operation of the battery charging apparatus during a period of low voltage.

In operation the variable resistor 41 is present to provide a predetermined voltage on tap 40 in response to a given voltage on the load 30. When the voltage on load 30 is less than the predetermined level, the current flow from point 51 of regulated reference potential through diode 45 and variable resistor 41 will provide a sufficiently large signal on lead 39 to gate 38 of the controlled rectifier 34 to cause the controlled rectifier 34 to conduct. When element 34 conducts, a relatively large charging potential and current is provided through controlled rectifier 34, to load 30 by way of lead 32.

During the charging cycle, the voltage across the load 30 will increase, thus decreasing the current flow from point 51 through variable resistor 41 and diode 45. When the voltage across the load reaches a predetermined level, determined in part by the positioning of the variable tap 40 of resistor 41, the voltage on lead 39 supplied to gate 38 will be insufficient to render the controlled rectifier 34 conductive whereupon the power supply to the load through the controlled rectifier 34 will be terminated.

However, the continuous minimum direct current power level will still be provided as hereinbefore described by way of resistor 31 to the load.

If a load 30, such as a precharged battery, having a voltage level exceeding the predetermined level is attached to the charging circuit, little or no current will flow through diode 45 and variable resistor 41. Therefore, a voltage insufficient to render controlled rectifier 34 conductive will appear on lead 39 to gate electrode 38. In this case, blocking diode 45 may be non-conductive, depending on the voltage level of the load. If the voltage level across the load is high, diode 45 is non-conductive and acts to prevent the circuit from discharging the load.

The preferred controlled rectifier used in this invention has a current conduction characteristic which gradually decreases in accordance with the applied gate voltage down to a predetermined level at which the controlled rectifier ceases to conduct. Such a characteristic is sometimes referred to as a "tapering conduction characteristic." In the alternative, a controlled rectifier having a characteristic which resembles a gate controlled switch may also be used, but is not preferred since it is more desirable to decrease the charging current to the battery as its voltage, or counter emf, is increased.

The preferred load for the charging circuit has been disclosed as a battery. However, other uses for the circuit are also contemplated. For example, the circuit could be used to drive a direct current motor where it is desired to reduce the applied current as the back emf of the motor increases while yet maintaining a continuous direct current supply to the motor even at full speed.

Figure 3:
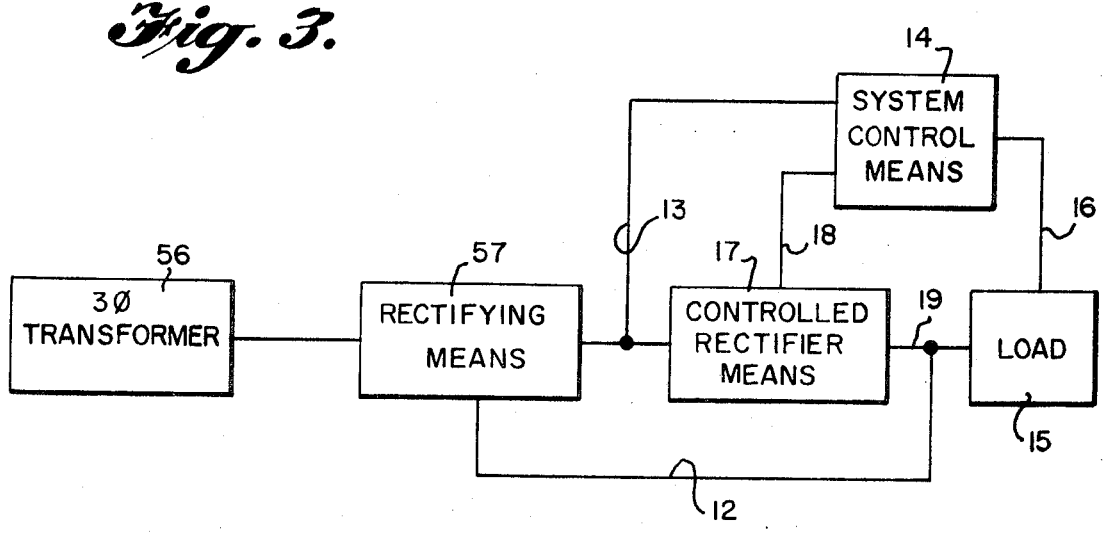
FIG. 3 is a block diagram of a polyphase charging network according to the invention.

FIG. 3 shows, in block diagram, the polyphase charging circuit according to the invention. A three phase transformer 56 is coupled to a rectifier assembly 57 which in turn is coupled by way of lead 12 to the load 15 and lead 13 to system control means 14. As described in connection with FIG. 1, the circuit operation as denoted by numerals 12 through 19 is like that previously discussed in connection with the description of FIG. 1.

Figure 4:
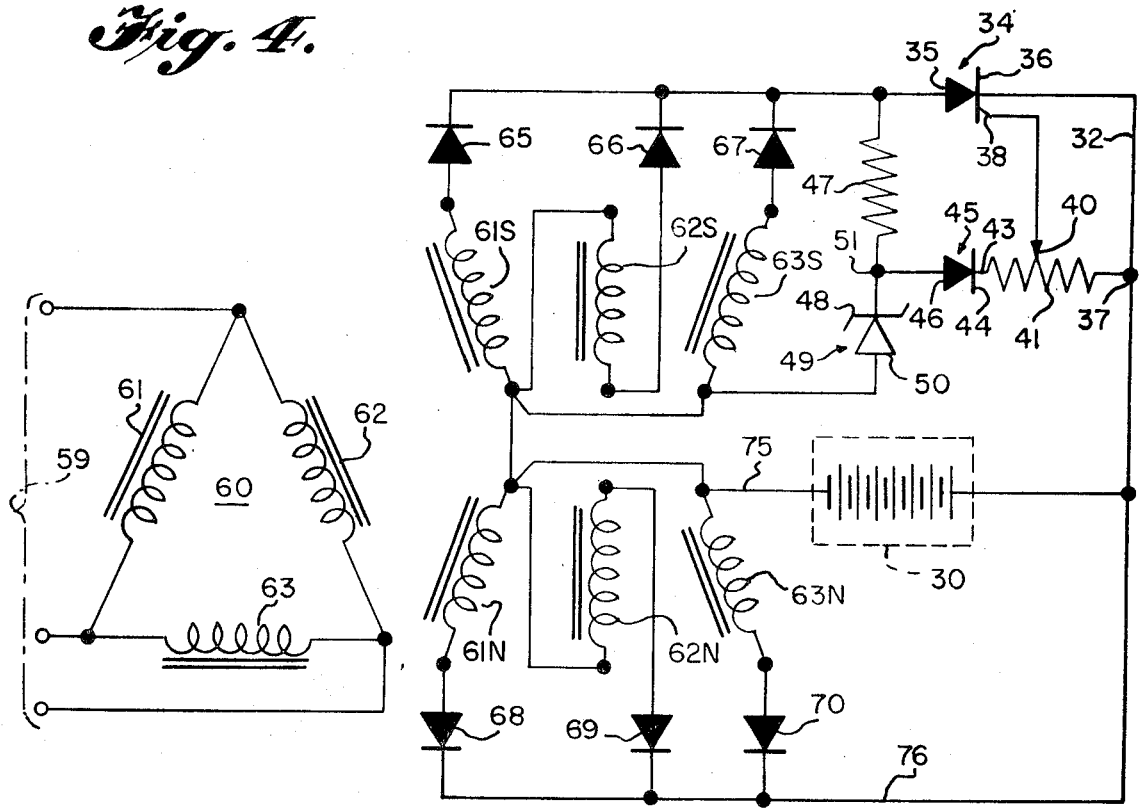
FIG. 4 is a detailed circuit diagram of a polyphase charging network according to the invention.

The operation of FIG. 4 is similar to that described in FIG. 2. Accordingly, like numerals have been assigned to the elements which may be used in either the single phase or polyphase embodiments.

A three phase input 60 coupled to a polyphase source 59 of alternating current signals includes a three phase transformer having primary windings 61, 62 and 63 shown for illustration, in a delta configuration. The transformer 60 has six output windings, denoted for convenience with an "S" designation denoting the controlled rectifier circuit and with an "N" designation for the non-controlled rectifier circuit. Thus, three phase transformation and impedance isolation is achieved by the transformer action.

Each of the induced secondary signals, displaced 60 degrees in phase, has individual rectification through diodes 65 through 70 respectively. Thus, by way of illustration, an alternating current signal appearing on secondary 61S is rectified through diode 65 and the signal appearing on winding 62S is rectified through diode 66.

The secondary windings are conveniently divided into two groups: One group for providing the minimum direct current to the load and a second group for providing the rectified output to the controlled rectifier means. The rectified outputs from diodes 68 through 70 coupled to a first group of secondary windings 61N, 62N, and 63N, respectively, provide the minimum direct current level to the load 30 by way of lead 75 and return lead 76. In the embodiment illustrated, it has not been found necessary to utilize voltage dropping resistors in circuit between the output of windings 61N, 62N, and 63N and the load although a specific installation may require additional resistors to provide the proper voltage levels. The voltage limitation provided by the high leakage transformer holds the peak voltage across windings 61N, 62N, and 63N to a value just above the rated voltage of the battery load, so that trickle current is controlled without the use of current-limiting and voltage dropping resistors.

On the other hand, the rectified output from the second group of windings 61S, 62S, and 63S, coupled to diodes 65 through 67, respectively, is used to provide the rectified input to the circuit which produces the supplemental direct current output level. This output is analogous to the output from diode 26 in FIG. 2 and is regulated by controlled rectifier 34 and the circuit control means as hereinbefore described.

In operation, by loading the system with a discharged load, such as a discharged battery, the controlled rectifier 34 will be biased on to give a full capacity output, as hereinbefore described. During this period rectifiers 65 through 70 are conducting. As the voltage across the load 30 tends to build up, the tapering conduction characteristic of the controlled rectifier 34 causes the output from the controlled rectifier 34 to taper toward a zero current level. Under these conditions, the output of rectifiers 65 through 67 is also reduced by the decrease in conduction of the controlled rectifier 34. When controlled rectifier 34 is cut off, diodes 68 through 70 continue to conduct to provide the minimum direct current level to the load as hereinbefore described.

We claim:

1. An electrical circuit for providing a first continuous power output and a second controlled regulated supplemental power output comprising, in combination:
   a. an electrical load capable of receiving said first continuous output and said second supplemental output;
   b. a source of alternating current signals;
   c. a high leakage transformer having an output circuit and an input circuit coupled to said alternating current signal source;
   d. rectifying means for rectifying said alternating current signal, having an output circuit and an input circuit coupled to the output circuit of said high leakage transformer;
   e. first charging circuit means coupled to the output of said rectifying means and to said load for providing said first continuous power output to said load;
   f. second charging circuit means for providing said second controlled regulated supplemental power output to said load at a level responsive to the voltage across said load, said second charging circuit means including:
      f-1. a controlled rectifier coupled to the output of said high leakage transformer, and having an output terminal coupled to said load and a gate terminal for variable control of the conduction of said controlled rectifier;
      f-2. reference voltage means coupled to the output of said rectifying means such that a reference voltage is established independently of the voltage across the load when the voltage output of said high leakage transformer exceeds a predetermined level; and
      f-3. circuit control means coupled to said reference voltage means, said load, and said gate terminal for variably controlling the conduction of said controlled rectifier by comparing the voltage across said load to said reference voltage so that the controlled rectifier is rendered conductive when the voltage across said load is below a predetermined level, the conductivity being a function of said compared voltages, and the controlled rectifier is rendered non-conductive when the voltage across said load exceeds a predetermined level; and
   g. wherein the peak voltage across the output circuit of said high leakage transformer remains substantially constant for nominal variations in source voltage, such that said reference voltage means continuously provides said reference voltage during nominal low voltage variations of said alternating current source.

2. The apparatus as described in claim 1 wherein said first continuous current is a function only of said alternating current source and the voltage across said electrical load, and is independent of the operation of said second charging circuit means.

3. The apparatus as described in claim 1 wherein said electrical load is to be charged to a rated voltage, and said high leakage transformer maintains said peak voltage at a value greater than said reference voltage and restrains said peak voltage to a value just nominally above said rated voltage.

* * * * *